United States Patent
Morimoto et al.

(10) Patent No.: US 9,720,912 B2
(45) Date of Patent: Aug. 1, 2017

(54) DOCUMENT MANAGEMENT SYSTEM, DOCUMENT MANAGEMENT METHOD, AND DOCUMENT MANAGEMENT PROGRAM

(71) Applicant: UBIC, Inc., Tokyo (JP)

(72) Inventors: Masahiro Morimoto, Tokyo (JP); Yoshikatsu Shirai, Tokyo (JP); Hideki Takeda, Tokyo (JP); Akiteru Hanatani, Tokyo (JP)

(73) Assignee: UBIC, Inc., Tokyo (JP)

( * ) Notice: Subject to any disclaimer, the term of this patent is extended or adjusted under 35 U.S.C. 154(b) by 0 days.

(21) Appl. No.: 14/648,613

(22) PCT Filed: Nov. 22, 2013

(86) PCT No.: PCT/JP2013/081521
§ 371 (c)(1),
(2) Date: May 29, 2015

(87) PCT Pub. No.: WO2014/084140
PCT Pub. Date: Jun. 5, 2014

(65) Prior Publication Data
US 2015/0339298 A1    Nov. 26, 2015

(30) Foreign Application Priority Data
Nov. 30, 2012    (JP) .................... 2012-263326

(51) Int. Cl.
*G06F 17/30* (2006.01)
*G06Q 50/18* (2012.01)

(52) U.S. Cl.
CPC .... *G06F 17/30011* (2013.01); *G06F 17/3053* (2013.01); *G06F 17/30705* (2013.01); *G06Q 50/18* (2013.01)

(58) Field of Classification Search
None
See application file for complete search history.

(56) References Cited

U.S. PATENT DOCUMENTS 6,831,752 B1 * 12/2004  Matsuo ................ G06F 3/1204
                                                          358/1.13
7,769,759 B1 *  8/2010  Gartung ........... G06F 17/30707
                                                           707/737
(Continued)

FOREIGN PATENT DOCUMENTS

JP    2004-515844 A    5/2004
JP    2007-172249 A    7/2007
(Continued)

OTHER PUBLICATIONS

Written Opinion of the International Searching Authority in International Application No. PCT/JP2013/081521, dated Jan. 21, 2014.
(Continued)

*Primary Examiner* — Belix M Ortiz Ditren
(74) *Attorney, Agent, or Firm* — Lewis Roca Rothgerber Christie LLP (57) ABSTRACT

It is possible to reduce a review load of a reviewer. A document management system includes a screen display unit that displays a document group having a plurality of pieces of document data extracted from digital information to be determined for relevance to a lawsuit by a user and classification buttons allowing the user to select classification conditions for classifying the document group under predetermined conditions, a selection information reception unit that receives information relating to a classification button selected by the user among the classification button displayed by the screen display unit as selection information, and a classification instruction unit that analyzes the document group based on the selection information, classifies document data in the document group using the analysis
(Continued)

result, and instructs the screen display unit to display the document group based on the classification result.

7 Claims, 6 Drawing Sheets

(56) References Cited

U.S. PATENT DOCUMENTS

| | | | |
|---|---|---|---|
| 8,620,918 B1* | 12/2013 | Ben-Artzi | G06F 17/30707 707/737 |
| 2002/0062229 A1 | 5/2002 | Alban et al. | |
| 2003/0120507 A1* | 6/2003 | Aasman | G06Q 10/10 705/1.1 |
| 2012/0239666 A1 | 9/2012 | Morimoto et al. | |
| 2012/0246185 A1 | 9/2012 | Morimoto et al. | |
| 2012/0290578 A1 | 11/2012 | Morimoto et al. | |

FOREIGN PATENT DOCUMENTS

| | | |
|---|---|---|
| JP | 2011-209930 A | 10/2011 |
| JP | 2011-209931 A | 10/2011 |
| JP | 2012-032859 A | 2/2012 |
| JP | 2012-181851 A | 9/2012 |

OTHER PUBLICATIONS

International Preliminary Report on Patentability in International Application No. PCT/JP2013/081521, dated Jun. 2, 2015.
International Search Report in PCT International Application No. PCT/JP2013/081521, dated Jan. 21, 2014.

\* cited by examiner

DOCUMENT MANAGEMENT SYSTEM, DOCUMENT MANAGEMENT METHOD, AND DOCUMENT MANAGEMENT PROGRAM

TECHNICAL FIELD

The present invention relates to a document management system, a document management method, and a document management program, and in particular, to a document management system, a document management method, and a document management program for collecting document information relating to a lawsuit.

BACKGROUND ART

In the related art, means or a technique has been proposed which collects and analyzes devices, data, and electronic records required to find or investigate the cause and substantiates legal evidence when there is a crime or a legal conflict related to computers, such as illegal access or confidential information leakage.

In a U.S. civil lawsuit, electronic discovery (eDiscovery) is required, and both the plaintiff and the defendant in the lawsuit have the responsibility to submit all of related digital information as evidence. For this reason, digital information recorded in the computer or the server needs to be submitted as evidence.

With the rapid development and spread of IT, most of information is created using the computer in the present business world. Therefore, there is flood of digital information within the same company.

For this reason, during the pretrial period, when evidence exhibit is submitted to court, even confidential digital information which is not necessarily related to the lawsuit may be likely to be included in the evidence exhibit submission. There is also a problem in that confidential document information which is not related to the lawsuit is submitted.

In recent years, a technique relating to document information in a document management system has been proposed in PTL 1 to PTL 3. PTL 1 discloses a document management system which designates a specific person from one or more subjects included in subject information regarding a person who is subject to an order to submit documents, extracts only digital document information which is accessed by the specific person based on access history information relating to the designated specific person, sets additional information indicating whether or not each document file of the extracted digital document information is related to a lawsuit, and outputs document files related to the lawsuit based on the additional information.

PTL 2 discloses a document management system which displays recorded digital information, sets subject specification information indicating whether or not each of a plurality of document files is related to any one of the subjects included in subject information, sets such that the set subject specification information is recorded in a storage unit, designates at least one or more subjects, searches for a document file in which the subject specification information corresponding to the designated subject is set, sets additional information indicating whether or not the searched document file is related to a lawsuit on a display unit, and outputs document files related to the lawsuit based on the additional information.

PTL 3 discloses a document management system which receives the designation of at least one or more document files included in digital document information, receives designation indicating a language used to translate the designated document file, translates the designated document file into the designated language, extracts a common document file indicating the same content as the designated document file from digital document information recorded in a recording unit, generates translation-related information indicating that the extracted common document file is translated by quoting the content of the translated document file, and outputs a document file related to a lawsuit based on the translation-related information.

CITATION LIST

Patent Literature

[PTL 1] JP-A-2011-209930
[PTL 2] JP-A-2011-209931
[PTL 3] JP-A-2012-32859

SUMMARY OF INVENTION

Technical Problem

However, for example, in the document management systems disclosed in PTL 1 to PTL 3, a huge amount of document information of the subjects who use a plurality of computers and servers is collected.

In an operation of classifying whether or not a huge amount of digital document information is appropriate as evidence exhibit of the lawsuit, a user who is called a reviewer needs to visibly check the document information and classify each piece of document information. Therefore, there is a tendency to take a lot of effort and time to perform the operation, and further improvement is required.

According, the invention has been made in view of the above-described problems, and an object of the invention is to provide a document management system, a document management method, and a document management program capable of further reducing a review load of a reviewer.

Solution to Problem

According to an aspect of the invention, there is provided a document management system that acquires digital information recorded in a plurality of computers or a server and analyzes the acquired digital information for relevance to a lawsuit. The document management system includes a screen display unit that displays a document group having a plurality of pieces of document data extracted from the digital information to be determined for relevance to the lawsuit by a user and classification buttons allowing the user to select classification conditions for classifying the document group under predetermined conditions, a selection information reception unit that receives information relating to a classification button selected by the user among the classification buttons displayed by the screen display unit as selection information, and a classification instruction unit that analyzes the document group based on the selection information, classifies document data in the document group using the analysis result, and instructs the screen display unit to display the document group based on the classification result.

The selection information reception unit may receive at least one of a domain name of mail, an extension of document data, updated date and time of document data, a content of document data, and a creator of document data as selection information.

The document management system may further include a result reception unit that receives a determination result of relevance by the user on the document group classified by the classification instruction unit, a selection unit that classifies document data included in the document group determined for relevance by the user for each determination result based on the determination result and analyzes and selects an element commonly appearing in the classified document data, an element recording unit that records the selected element, a search unit that searches for an element recorded in the element recording unit from the document data, and a score calculation unit that calculates a score indicating relevance between the determination result and the document data using a search result of the search unit and an analysis result of the selection unit.

The classification instruction unit may analyze whether or not an element recorded in the element recording unit is included in document data in the document group.

The document management system may further include an extraction unit that extracts a predetermined number of pieces of document data from the digital information as a document group. The classification instruction unit may classify document data in the document group extracted by the extraction unit.

The document management system may further include a set information registration unit that receives a determination result of relevance by the user as an identification code to each piece of document data and registers combinations of identification codes as set information. The screen display unit may display the registered set information, and when the set information is selected by the user, the result reception unit may receive receives a determination result with identification information assigned to document data based on the selected set information.

The screen display unit may receive change in the display positions of the classification buttons, the set information, and the document group from the user as arrangement information and may change the display positions of the classification buttons, the set information, and the document group to the arrangement changed by the user based on the arrangement information.

According to another aspect of the invention, there is provided a document management method in a document management system that acquires digital information recorded in a plurality of computers or a server and analyzes the acquired digital information for relevance to a lawsuit. The document management method causes a computer to execute a step of displaying a document group having a plurality of pieces of document data extracted from the digital information to be determined for relevance to the lawsuit by a user and classification buttons allowing the user to select classification conditions for classifying the document group under predetermined conditions, a step of receiving information relating to a classification button selected by the user among the displayed classification buttons as selection information, and a step of analyzing the document group based on the selection information, classifying document data in the document group using the analysis result, and instructing to display the document group based on the classification result.

According to still another aspect of the invention, there is provided a document management program in a document management system that acquires digital information recorded in a plurality of computers or a server and analyzes the acquired digital information for relevance to a lawsuit. The document management program causes a computer to implement a function of displaying a document group having a plurality of pieces of document data extracted from the digital information to be determined for relevance to the lawsuit by a user and classification buttons allowing the user to select classification conditions for classifying the document group under predetermined conditions, a function of receiving information relating to a classification button selected by the user among the displayed classification buttons as selection information, and a function of analyzing the document group based on the selection information, classifying document data in the document group using the analysis result, and instructing to display the document group based on the classification result.

Advantageous Effects of Invention

The document management system of the invention includes a screen display unit that displays a document group having a plurality of pieces of document data extracted from the digital information to be determined for relevance to the lawsuit by a user and classification buttons allowing the user to select classification conditions for classifying the document group under predetermined conditions, a selection information reception unit that receives information relating to a classification button selected by the user among the classification buttons displayed by the screen display unit as selection information, and a classification instruction unit that analyzes the document group based on the selection information, classifies document data in the document group using the analysis result, and instructs the screen display unit to display the document group based on the classification result. Therefore, when the user determines (reviews) relevance, it is possible to perform a review after classifying (filtering) document data to be reviewed, and to implement reduction of a review load and efficiency in a review.

The document management system further includes a result reception unit that receives a determination result of relevance by the user on the document group classified by the classification instruction unit, a selection unit that classifies document data included in the document group determined for relevance by the user for each determination result based on the determination result and analyzes and selects an element commonly appearing in the classified document data, an element recording unit that records the selected element, a search unit that searches for an element recorded in the element recording unit from the document data, and a score calculation unit that calculates a score indicating relevance between the determination result and the document data using a search result of the search unit and an analysis result of the selection unit. Therefore, it is possible to automatically perform a review based on the review result of the user, and to achieve efficiency in a review.

The document management system further includes an extraction unit that extracts a predetermined number of pieces of document data from the digital information as a document group. The classification instruction unit classifies document data in the document group extracted by the extraction unit. Therefore, it is possible to narrow down a huge amount of collected digital information to a predetermined number of documents for processing, and to achieve high speed processing.

The document management system further includes a set information registration unit that receives a determination result of relevance by the user as an identification code to each piece of document data and registers combinations of identification codes as set information. The screen display unit displays the registered set information, and when the set information is selected by the user, the result reception unit receives a determination result with identification information assigned to document data based on the selected set information. Therefore, even when a plurality of identification codes need to be assigned to single document data, the user can assign a plurality of identification codes to document data with a short process.

The selection information reception unit receives at least one of a domain name of mail, an extension of document data, updated date and time of document data, a content of document data, and a creator of document data as selection information. Therefore, it is possible to perform filtering based on tag information attached to document data as well as the content of document data.

The classification instruction unit analyzes whether or not an element recorded in the element recording unit is included in document data in the document group. Therefore, it is possible to filter document data using the recorded element.

The screen display unit receives change in the display positions of the classification buttons, the set information, and the document group from the user as arrangement information and changes the display positions of the classification buttons, the set information, and the document group to the arrangement changed by the user based on the arrangement information. Therefore, the user can freely customize the layout.

DESCRIPTION OF EMBODIMENTS

[First Embodiment]

Hereinafter, a first embodiment of the invention will be described referring to FIGS. 1 to 3.

Figure 1:
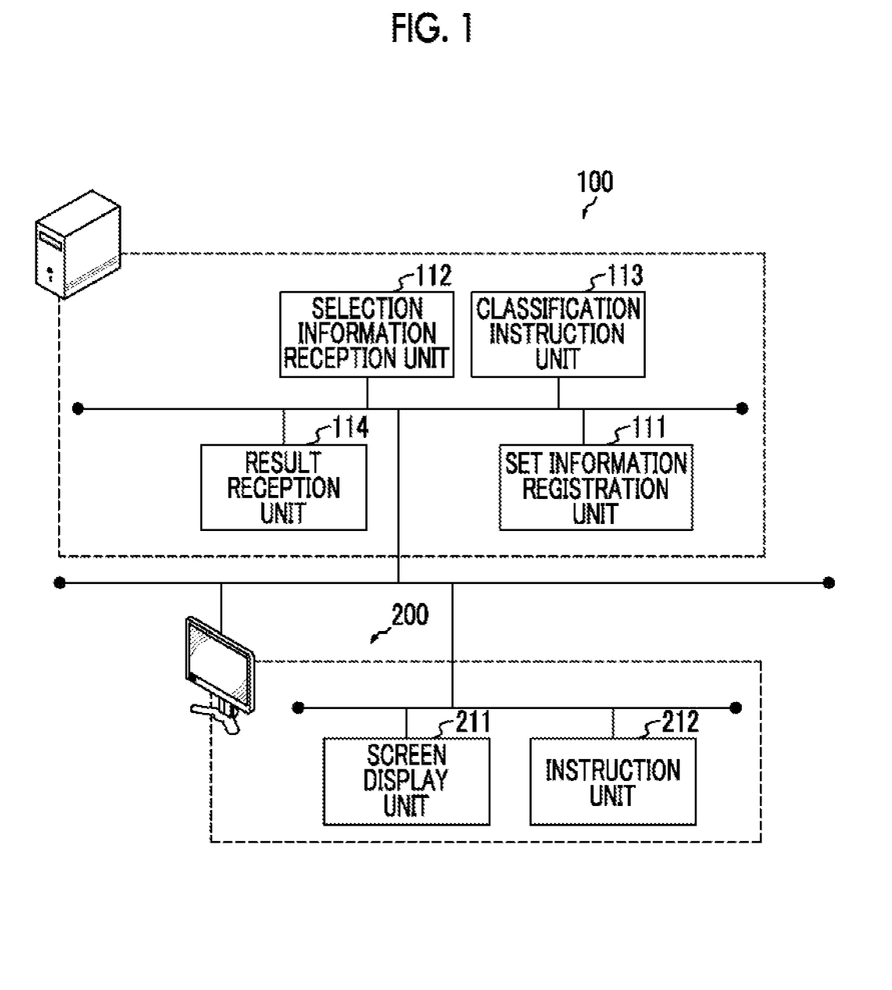
FIG. 1 is a block diagram of a document management system according to a first embodiment of the invention.

FIG. 1 is a block diagram of a document management system according to this embodiment.

The document management system according to the first embodiment of the invention includes a client terminal 200, and a server apparatus 100. The client terminal 200 includes a screen display unit 211 that displays a document group having a plurality of pieces of document data extracted from the digital information to be determined for relevance to the lawsuit by a user and classification buttons allowing the user to select classification conditions for classifying the document group under predetermined conditions, and an instruction unit 212 that receives an input from the user.

The server apparatus 100 includes a selection information reception unit 112 that receives information relating to a classification button selected by the user among the classification buttons displayed by the screen display unit 211 as selection information, and a classification instruction unit 113 that analyzes the document group based on the selection information, classifies document data in the document group using the analysis result, and instructs the screen display unit 211 to display the document group based on the classification result. The server apparatus 100 further includes a result reception unit 114 that receives a determination result of relevance by the user, and a set information registration unit 111 that receives a determination result of relevance by the user as an identification code to each piece of document data and registers combinations of identification codes as set information. At this time, the screen display unit 211 displays the registered set information, and when the set information is selected by the user, the result reception unit 114 receives a determination result with identification information assigned to document data based on the selected set information.

The document management system includes a computer or a server, and a CPU executes a program recorded in a ROM based on various inputs to operate as various functional units. The program may be stored in a storage medium, such as a CD-ROM, or may be distributed through a network, such as the Internet, and then installed on the computer.

In this embodiment, a user who is called a reviewer determines relevance to the lawsuit in order to extract document data required to be submitted for the lawsuit from document data. Document data refers to information including one or more words. Examples of document data include electronic mail, a presentation document, a table calculation document, a meeting document, a contract, an organization chart, and a business plan. In addition, scan data can be treated as document data. In this case, the document management system may include an optical character reader (OCR) device such that scan data can be converted to text data. When scan data is changed to text data by the OCR device, it is possible to analyze or search for elements described below from scan data.

The document group refers to a set of document data whose relevance is to be determined by the user. The operation of the system or the user determining whether document data is related to the lawsuit is referred to as a review.

The review (relevance determination) refers to the system or a person determining whether or not document data is to be submitted to the lawsuit. For example, in the review, a document group, which is document data to be reviewed, is classified into a plurality of types based on the degree of relevance to the lawsuit or how document data is related to the lawsuit.

The server apparatus 100 and the client terminal 200 are connected through a communication network. The communication network refers to a wired or wireless communication line. For example, the communication network is a telephone line or an Internet line.

The function of each component described in FIG. 1 will be described.

The screen display unit 211 is a display or a liquid crystal monitor that displays a document group having document data to be reviewed or classification buttons on the client terminal 200. The screen display unit 211 may display set information described below. The screen display unit 211 may receive change in the display positions of the classification buttons, the set information, and the document group from the user as arrangement information and may change the display positions of the classification button, the set information, and the document group to the arrangement changed by the user based on the arrangement information. With this, the user can arbitrarily customize the configuration of the screen.

The classification buttons refer to icons indicating conditions for classifying or filtering document data. The classification buttons may be checkboxes, radio buttons, or pull-downs. The classification buttons may be displayed by the number of types of conditions for classifying the document group, and the selection information reception unit may receive a classification button selected by the user as selection information. The user can select a condition for filtering document data by clicking a classification button.

Figure 2:
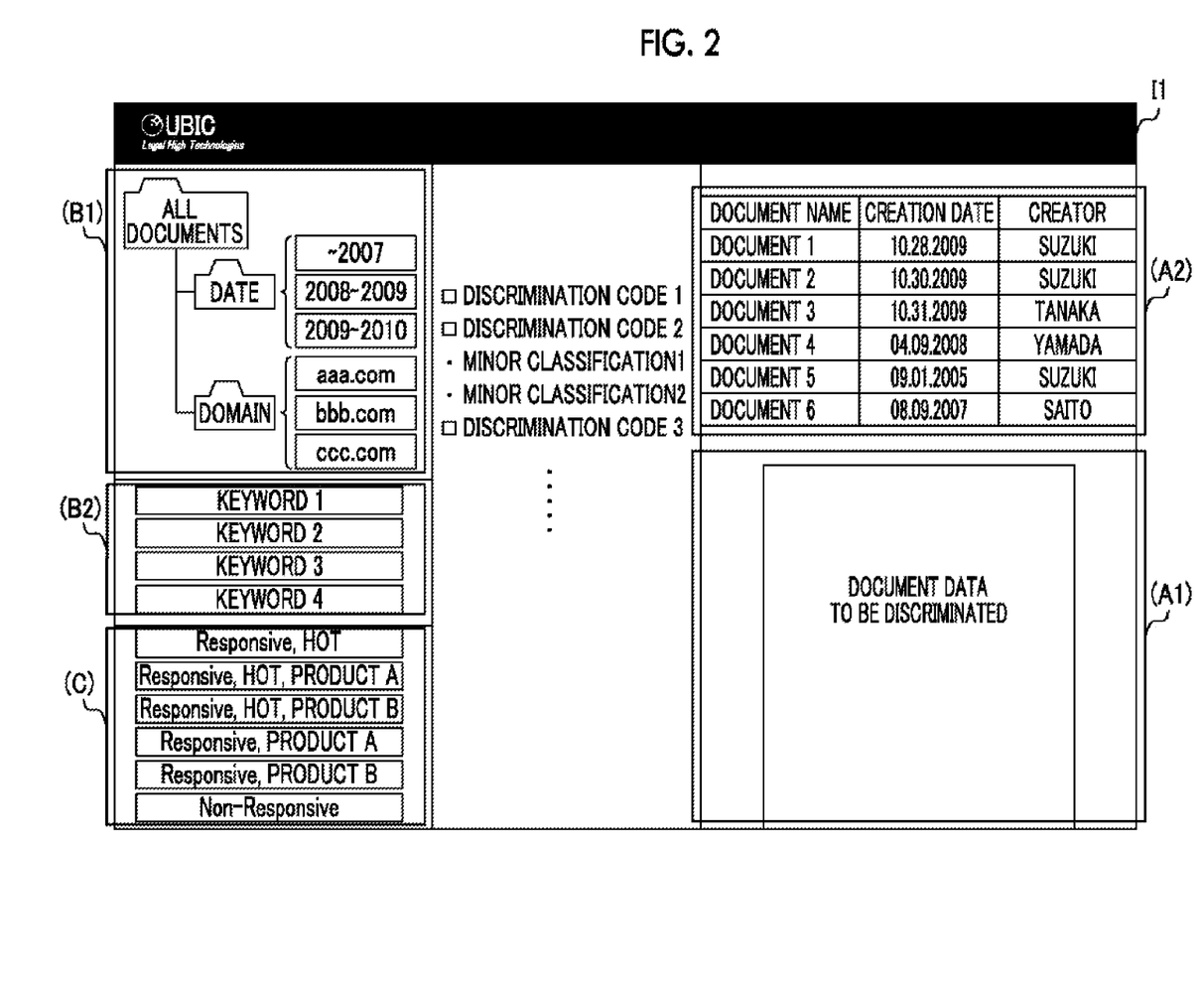
FIG. 2 is a diagram schematically showing a review screen according to the first embodiment of the invention.
Figure 3:
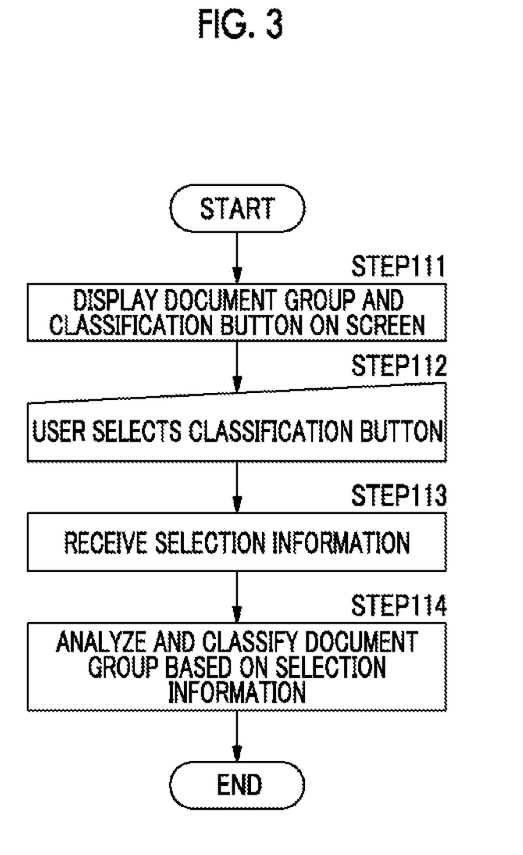
FIG. 3 is a flowchart showing a process flow according to the first embodiment of the invention.

FIG. 2 is a diagram schematically showing a review screen I1 which is displayed by the screen display unit 211. (A1) of FIG. 2 is document data which is reviewed by the user. In (A2), a list of document data included in the document group to be reviewed is displayed. (B1) and (B2) of FIG. 2 indicate classification buttons. If the user selects and clicks a condition for filtering from the classification buttons displayed in (B1) and (B2) of FIG. 2, a list of document data conforming to the selected condition is displayed in (A2).

Returning to FIG. 1, the rest of the functions of the respective components will be described. The instruction unit 212 is a mouse or a keyboard provided in the client terminal 200, and receives an operation or an input from the user.

The selection information reception unit 112 receives information relating to a classification button selected by the user as selection information. For example, the selection information reception unit 112 may receive at least one of a domain name of mail, an extension of document data, updated date and time of document data, a content of document data, and a creator of document data as selection information.

The classification instruction unit 113 classifies or filters document data based on the selection information and instructs the screen display unit 211 to display document data in a filtered state. For example, when a classification button of creation date and time "from 2008 to 2009" is selected, the classification instruction unit 113 extracts document data created in this period from the document group and instructs the screen display unit 211 to display the extracted document data on the review screen I1.

The result reception unit 114 receives a review result of each piece of document data by the user. The user assigns an identification code to document data according to the degree of relevance to the lawsuit in the review. For example, a "Responsive" code is assigned to document data which has high relevance to the lawsuit and is required to be submitted as evidence, and a "Non-Responsive" code is assigned to document data not required to be submitted. A "HOT" code is assigned to document data, which has high relevance to the lawsuit and is particularly important evidence, among document data assigned with the "Responsive" code together with the "Responsive" code. It is assumed that a "PRODUCT A" code is assigned to document data, which has a content with high relevance to a product A, among document data assigned with the "Responsive" code, and a "PRODUCT B" code is assigned to document data, which has a content with high relevance to a product B, among document data assigned with the "Responsive" code. At this time, the result reception unit 114 can receive each identification code as a result of relevance determination.

The set information registration unit 111 registers combinations of identification codes. When the above-described identification codes are used in the review, as combinations of identification codes which are likely to be assigned to single document data, six kinds of "Responsive, PRODUCT A, HOT", "Responsive, PRODUCT B, HOT", "Responsive, HOT", "Responsive, PRODUCT A", "Responsive, PRODUCT B", AND "Non-Responsive" are assumed. In this case, the set information registration unit 111 can register the six kinds of combinations as set information, and the result reception unit 114 can receive set information selected by the user as a review result to document data. With this, the user can assign a plurality of identification codes to document data with a short process.

Next, the flow of a process of the document management system will be described referring to FIG. 3. FIG. 3 is a flowchart showing a process flow of the document management system.

The screen display unit 211 displays the document group to be reviewed and the classification buttons on the review screen I1 (STEP111). The server apparatus 100 extracts the document group to be reviewed from collected digital information and instructs the screen display unit 211 to display document data in the document group on the screen of the client terminal 200. As shown on the review screen I1 of FIG. 2, the screen display unit 211 displays the classification buttons in an upper left window of the screen, a tag set in a lower left window, and document data in a right window during initial activation. The user can drag and drop a window desired to change the arrangement on the screen, thereby changing the arrangement of the windows of the respective functions on the review screen I1. At this time, the screen display unit 211 displays the respective windows in a changed layout after the next activation.

If the user selects an arbitrary classification button from the classification buttons displayed on the review screen I1 (STEP112), the selection information reception unit 112 receives the selected classification button as selection information (STEP113). The classification instruction unit 113 analyzes document data in the document group based on the selection information and instructs the screen display unit 211 to display document data conforming to the selected condition (STEP114). For example, when a classification button of "KEYWORD 1" displayed in (B2) of FIG. 2 is clicked, the classification instruction unit 113 instructs the screen display unit 211 to display document data including the keyword 1.

The user reviews each piece of displayed document data, and sets and clicks an appropriate tag combination from tag set buttons shown in (C) of FIG. 2, thereby providing a review result.

[Second Embodiment]

Hereinafter, a second embodiment of the invention will be described referring to FIGS. 4 to 6.

Figure 4:
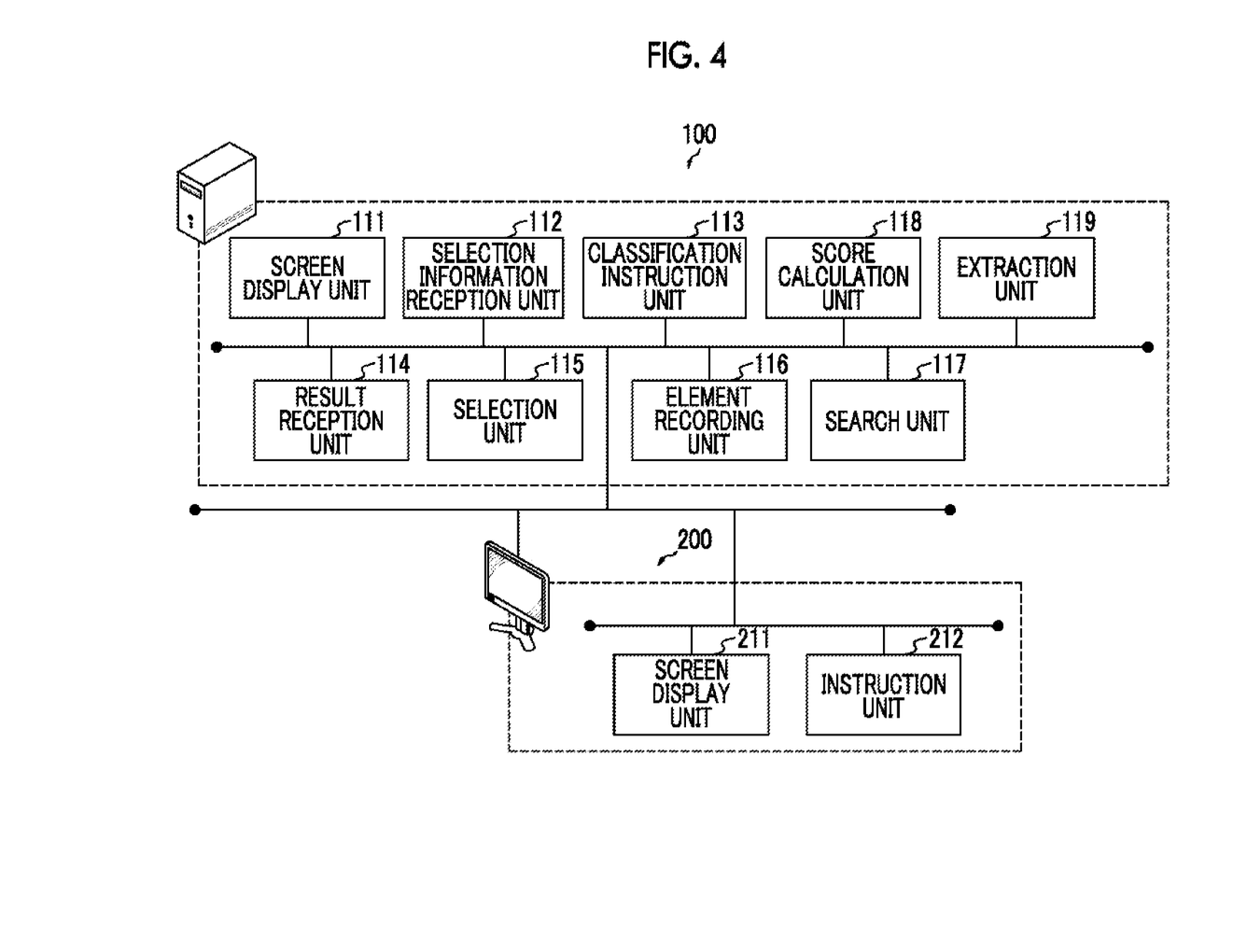
FIG. 4 is a block diagram of a document management system according to a second embodiment of the invention.

FIG. 4 is a block diagram of a document management system according to this embodiment.

The document management system according to the second embodiment of the invention includes a client terminal 200 and a server apparatus 100. The client terminal 200 includes a screen display unit 211 that displays a document group having a plurality of pieces of document data extracted from the digital information to be determined for relevance to the lawsuit by a user and classification buttons allowing the user to select classification conditions for classifying the document group under predetermined conditions, and an instruction unit 212 that receives an input from the user.

The server apparatus 100 further includes a selection information reception unit 112 that receives information relating to a classification button selected by the user among the classification buttons displayed by the screen display unit 211 as selection information, and a classification instruction unit 113 that analyzes the document group based on the selection information, classifies document data in the document group using the analysis result, and instructs the screen display unit 211 to display the document group based on the classification result. The server apparatus 100 further includes a result reception unit 114 that receives a determination result of relevance by the user on the document group classified by the classification instruction unit 113, a selection unit 115 that classifies document data included in the document group determined for relevance by the user for each determination result based on the determination result and analyzes and selects an element commonly appearing in the classified document data, an element recording unit 116 that records the selected element, a search unit 117 that searches for an element recorded in the element recording unit 116 from the document data, a score calculation unit 118 that calculates a score indicating relevance between the determination result and the document data using a search result of the search unit 117 and an analysis result of the selection unit 115, and an extraction unit 119 that extracts a predetermined number of pieces of document data from the digital information as a document group.

The extraction unit 119 extracts document data from digital information. When extracting document data, document data is sampled randomly from the digital information. In addition, document data may be extracted based on an attribute, such as updated date and time of document data. In this embodiment, the classification instruction unit 113 classifies document data in the document group extracted by the extraction unit 119.

The result reception unit 114 receives a result of determination (review) of relevance to the lawsuit on document data by the user.

The selection unit 115 selects an element. The element refers to a component of document data, such as a word, a symbol, or a figure included in document data. For example, the element may be each phoneme of a set of phonemes, such as a morpheme, which is smallest phonetic unit that can be divided without losing its meaning in a given language. For example, the elements of a sentence of "perform classification of a document" may be "document", "classification", and "perform".

The selection unit 115 may analyze and select an element commonly appearing in document data with the same determination result. The determination result refers to a result of determination of relevance to the lawsuit on the document group by the user. The determination result may indicate a classification code indicating the degree of relevance to the lawsuit assigned to a document by the user. The selection unit 115 may refer to an evaluation value of an element when selecting an element.

The evaluation value refers to a value indicating the characteristics of the element. The evaluation value may indicate the amount of transmitted information of the element. The amount of transmitted information refers to an amount indicating the measure of interdependence between two probability variables in probability theory and information theory. Specifically, the amount of transmitted information may indicate the dependence between the element and the determination result of relevance to a document including the element.

Figure 5:
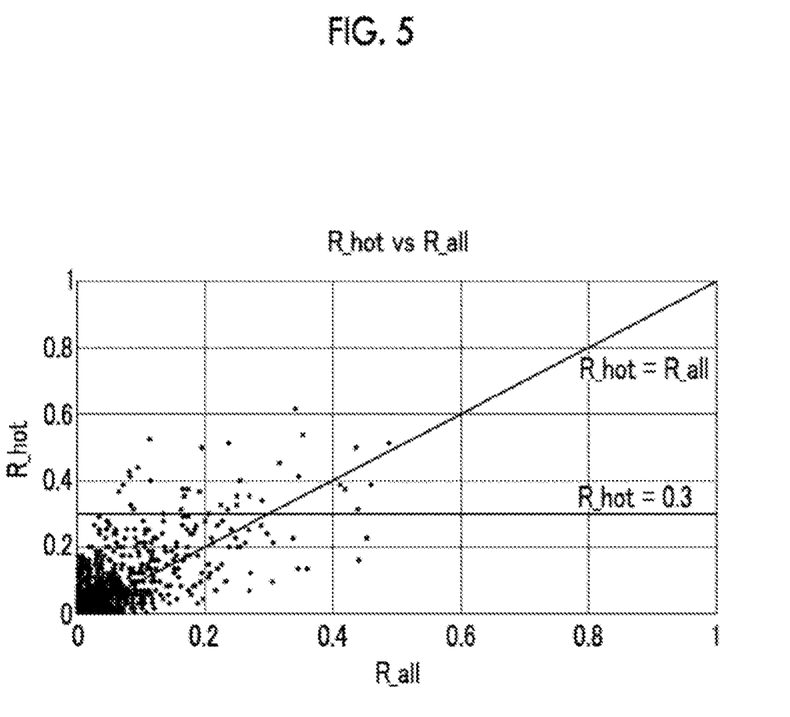
FIG. 5 is a graph showing an analysis result in a selection unit according to the second embodiment of the invention.
Figure 6:
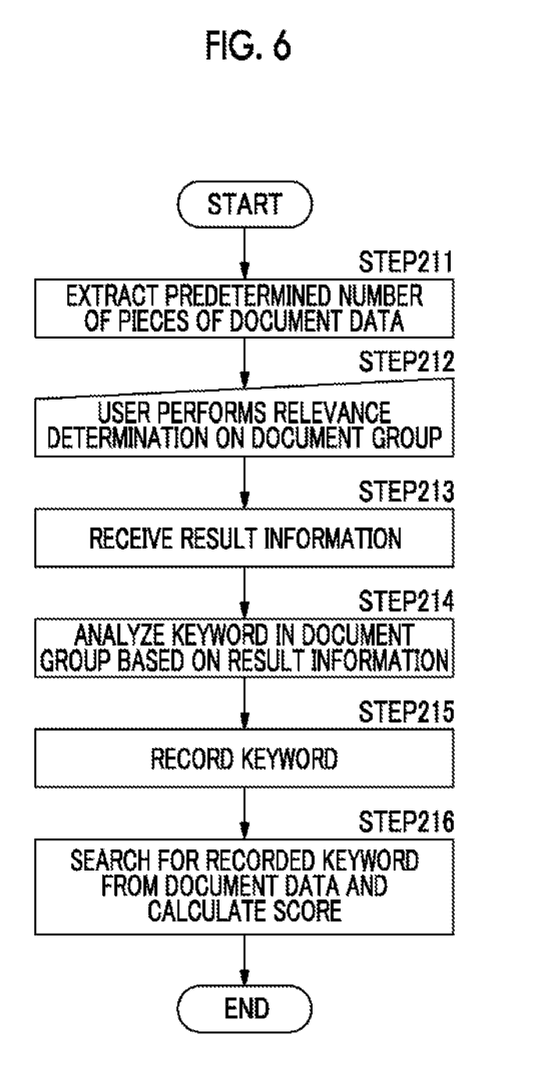
FIG. 6 is a flowchart showing a process flow according to the second embodiment of the invention.

FIG. 5 is a graph of an analysis result in the selection unit 115 for an element commonly frequently appearing in document data determined to have relevance. In FIG. 5, the vertical axis R_hot indicates the ratio of document data determined to have relevance including an element selected as an element associated with document data determined to have relevance among all pieces of document data determined to have relevance by the user. The horizontal axis R_all indicates the ratio of document data, which includes an element searched by the search unit 117 described below, among all pieces of document data reviewed by the user. In this embodiment, the selection unit 115 selects an element plotted above a line R_hot=R_all as a common element in document data determined to have relevance.

The element recording unit 116 records elements. The element recording unit 116 may be used as a database.

The classification instruction unit 113 may analyze whether or not an element recorded in the element recording unit 116 is included in document data in the document group.

The search unit 117 searches for an element from document data.

The score calculation unit 118 calculates the score of document data. The score calculation unit 118 may calculate the score based on the evaluation value of an element included in the document data. The evaluation value may be calculated based on the appearance frequency of the element in document data or the amount of transmitted information, and may refer to the amount of information of the element exerted in certain document data.

The score refers to the degree of relevance to the lawsuit in certain document data. The score is calculated based on an element included in document data. For example, document data, in which an element especially required to be submitted at the lawsuit, may have a high score. Document data may be assigned with the initial value of the score based on given requirements. For example, the initial score may be calculated based on an element appearing in document data and the evaluation value of the element.

The score calculation unit 118 can calculate the score based on an element appearing in the document group and the evaluation value of the element from the following expression.

[Equation 1]

$$Scr = \sum_{i=0}^{N_i} i * (m_i * wgt_i^2) / \sum_{i=0}^{N_i} i * wgt_i^2 \tag{1}$$

$m_i$: the appearance frequency of an i-th element
$wgt_i$: the evaluation value of the i-th element The evaluation value of each element is determined based on the amount of transmitted information of the element. The evaluation value can be learned by the following expression.

[Equation 2]

$$wgt_{i,L} = \frac{\sqrt{wgt_{L-i}^2 + \gamma_L wgt_{i,L}^2 - \theta}}{\sqrt{wgt_{i,L}^2 + \sum_{l=1}^{L}(\gamma_L wgt_{i,l}^2 - \theta)}} \tag{2}$$

$wgt_{i,0}$: the evaluation value (initial value) of a selected i-th element before learning
$wgt_{i,L}$: the evaluation value of the selected i-th element after L-th learning
$\gamma_L$: a learning parameter in L-th learning
$\theta$: the threshold value of a learning effect A process flow of a prediction information generation process in this embodiment will be described referring to FIG. 6. First, the extraction unit 119 extracts a predetermined number of pieces of document data from digital information (STEP211). The screen display unit 211 displays the extracted document data on the client terminal 200 (STEP212). The result reception unit 114 receives a result of relevance determination of the user (STEP213), and the selection unit 115 analyzes document data from the result of relevance determination of the user and selects an element (STEP214). The selected element is recorded by the element recording unit 116 (STEP215). Next, the search unit 117 searches for the recorded element from each piece of document data, and the score calculation unit 118 calculates the score of each piece of document data using Expression (1) (STEP216).

Other components and functions are the same as those in the first embodiment.

The document management system includes the screen display unit 211 that displays the document group having a plurality of pieces of document data extracted from the digital information to be determined for relevance to the lawsuit by the user and the classification buttons allowing the user to select the classification conditions for classifying the document group under the predetermined conditions, the selection information reception unit 112 that receives information relating to a classification button selected by the user among the classification buttons displayed by the screen display unit 211 as selection information, and the classification instruction unit 113 that analyzes the document group based on the selection information, classifies document data in the document group using the analysis result, and instructs the screen display unit 211 to display the document group based on the classification result. Therefore, when the user determines (reviews) relevance, it is possible to perform a review after classifying (filtering) document data to be reviewed, and to implement reduction of a review load and efficiency in a review.

The document management system further includes the result reception unit 114 that receives the determination result of relevance by the user on the document group classified by the classification instruction unit 113, the selection unit 115 that classifies document data included in the document group determined for relevance by the user for each determination result based on the determination result and analyzes and selects an element commonly appearing in the classified document data, the element recording unit 116 that records the selected element, the search unit 117 that searches for an element recorded in the element recording unit 116 from the document data, and the score calculation unit 118 that calculates a score indicating relevance between the determination result and the document data using the search result of the search unit 117 and the analysis result of the selection unit 115. Therefore, it is possible to automatically perform a review based on the review result of the user, and to achieve efficiency in a review.

The document management system further includes the extraction unit 119 that extracts a predetermined number of pieces of document data from the digital information as a document group. The classification instruction unit 113 classifies document data in the document group extracted by the extraction unit 119. Therefore, it is possible to narrow down a huge amount of collected digital information to a predetermined number of documents for image processing, and to achieve high speed processing.

The document management system further includes the set information registration unit 111 that receives the determination result of relevance by the user as the identification code to each piece of document data and registers the combinations of identification codes as set information. The screen display unit 211 displays the registered set information, and when the set information is selected by the user, the result reception unit 114 receives the determination result with identification information assigned to document data based on the selected set information. Therefore, even when a plurality of identification codes need to be assigned to single document data, the user can assign a plurality of identification codes to single document data with a short process.

The selection information reception unit 112 receives at least one of a domain name of mail, an extension of document data, updated date and time of document data, a content of document data, and a creator of document data as selection information. Therefore, it is possible to perform filtering based on tag information attached to document data as well as the content of document data.

The classification instruction unit 113 analyzes whether or not an element recorded in the element recording unit 116 is included in document data in the document group. Therefore, it is possible to filter document data using the recorded element.

The screen display unit 211 receives change in the display positions of the classification buttons, the set information, and the document group from the user as arrangement information and changes the display positions of the classification buttons, the set information, and the document group to the arrangement changed by the user based on the arrangement information. Therefore, the user can freely customize the layout.

[Other Embodiments]

Although the embodiments of the invention have been described, the invention is not limited to the above-described embodiments, and various modifications and alterations may be made based on the technical idea of the invention. For example, although the result reception unit 114 receives the review result by the user as the identification code, the invention is not limited thereto. For example, the result reception unit 114 may record whether or not document data to be reviewed is relevant to a lawsuit on a database as a flag.

REFERENCE SIGNS LIST

100: server apparatus
111: set information registration unit
112: selection information reception unit
113: classification instruction unit
114: result reception unit
115: selection unit
116: element recording unit
117: search unit
118: score calculation unit
119: extraction unit
200: client terminal
211: screen display unit
212: instruction unit
I1: review screen

The invention claimed is:

1. A document management system that acquires and analyzes acquired digital information for relevance to a matter, the document management system comprising:
   a screen display unit that displays a document group having a plurality of pieces of document data extracted from the digital information to be determined for relevance to the matter by a user and classification buttons allowing the user to select classification conditions for classifying the document group under predetermined conditions;
   a processor, and
   a memory, wherein the memory has stored thereon instructions that, when executed by the processor, causes the processor to:
   receive information relating to a classification button selected by the user among the classification buttons displayed by the screen display unit as selection information;

analyze the document group based on the selection information;
classify document data in the document group using the analysis result;
instruct the screen display unit to display the document group based on the classification result;
for each document group containing the classified document data, receive a result of relevance determination by the user;
based on the result of relevance determination, sort the document data included in the each document group for which the relevance determination has been made by the user;
select an element commonly appearing in the classified document data;
record the selected element;
search for the recorded element in the document data; and
calculate a score indicating a degree of relevance between the relevance determination result and the document data using the search result and the analysis result, based on an appearance frequency and an evaluation value of the selected element, wherein the evaluation value is learned progressively through numerous iterations of learnings;
wherein the processor further:
registers a plurality of identification codes as set information, wherein the screen display unit displays the registered set information, and
upon the set information being selected by the user, simultaneously assigns at least one of the plurality of identification codes to a document data corresponding to the selected set information.

2. The document management system according to claim 1, wherein the processor further receives at least one of a domain name of mail, an extension of document data, updated date and time of document data, a content of document data, and a creator of document data as selection information.

3. The document management system according to claim 1, wherein the processor further analyzes whether or not an element recorded is included in document data in the document group.

4. The document management system according to claim 1, wherein the processor further:
extracts a predetermined number of pieces of document data from the digital information as a document group and
classify the extracted document data in the document group.

5. The document management system according to claim 1, wherein the screen display unit receives change in the display positions of the classification buttons, the set information, and the document group from the user as arrangement information and changes the display positions of the classification buttons, the set information, and the document group to the arrangement changed by the user based on the arrangement information.

6. A document management method in a document management system that acquires and analyzes acquired digital information for relevance to a matter, the method comprising:
displaying a document group having a plurality of pieces of document data extracted from the digital information to be determined for relevance to the matter by a user and classification buttons allowing the user to select classification conditions for classifying the document group under predetermined conditions;
receiving information relating to a classification button selected by the user among the displayed classification buttons as selection information;
analyzing the document group based on the selection information;
classifying document data in the document group using the analysis result;
displaying the document group based on the classification result;
receiving a result of relevance determination by the user;
based on the result of relevance determination, sort the document data included in the each document group for which the relevance determination has been made by the user;
selecting an element commonly appearing in the classified document data;
recording the selected element;
searching for the recorded element in the document data; and
calculating a score indicating a degree of relevance between the relevance determination result and the document data using the search result and the analysis result, based on an appearance frequency and an evaluation value of the selected element, wherein the evaluation value is learned progressively through numerous iterations of learnings;
registering a plurality of identification codes as set information, wherein the screen display unit displays the registered set information, and
upon the set information being selected by the user, simultaneously assigning at least one of the plurality of identification codes to a document data corresponding to the selected set information.

7. A non-transitory computer readable medium comprising instructions executable by at least one processor and causing the at least one processor to perform a document management method in a document management system that acquires and analyzes acquired digital information for relevance to a matter, the method comprising:
displaying a document group having a plurality of pieces of document data extracted from the digital information to be determined for relevance to the matter by a user and classification buttons allowing the user to select classification conditions for classifying the document group under predetermined conditions;
receiving information relating to a classification button selected by the user among the displayed classification buttons as selection information;
analyzing the document group based on the selection information;
classifying document data in the document group using the analysis result;
displaying the document group based on the classification result;
receiving a result of relevance determination by the user;
based on the result of relevance determination, sort the document data included in the each document group for which the relevance determination has been made by the user;
selecting an element commonly appearing in the classified document data;
recording the selected element;
searching for the recorded element in the document data;
calculating a score indicating a degree of relevance between the relevance determination result and the document data using the search result and the analysis result, based on an appearance frequency and an evaluation value of the selected element, wherein the evaluation value is learned progressively through numerous iterations of learnings;

registering a plurality of identification codes as set information, wherein the screen display unit displays the registered set information, and upon the set information being selected by the user, simultaneously assigning at least one of the plurality of identification codes to a document data corresponding to the selected set information.

* * * * *